United States Patent
Behling et al.

(10) Patent No.: US 10,056,805 B2
(45) Date of Patent: Aug. 21, 2018

(54) VENTING GENERATOR ASSEMBLIES

(71) Applicant: Hamilton Sundstrand Corporation, Charlotte, NC (US)

(72) Inventors: David S. Behling, Belvidere, IL (US); Glenn C. Lemmers, Jr., Loves Park, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 153 days.

(21) Appl. No.: 14/873,505

(22) Filed: Oct. 2, 2015

(65) Prior Publication Data
US 2017/0098978 A1   Apr. 6, 2017

(51) Int. Cl.
*H02K 9/02* (2006.01)
*F16K 17/04* (2006.01)

(52) U.S. Cl.
CPC ........... *H02K 9/02* (2013.01); *F16K 17/0406* (2013.01)

(58) Field of Classification Search
CPC ....... H02K 3/24; F16K 17/0406; F16K 17/04; F16K 15/00
USPC ...................................... 310/61, 58
See application file for complete search history.

(56) References Cited

U.S. PATENT DOCUMENTS

| | | | | |
|---|---|---|---|---|
| 3,767,320 A * | 10/1973 | Theis, Jr. | ............. | A61C 1/0007 137/56 |
| 3,850,553 A * | 11/1974 | Wallace | ................ | B25B 23/145 137/56 |
| 4,325,398 A * | 4/1982 | Green | ................... | F16K 17/366 137/202 |
| 4,337,873 A * | 7/1982 | Johnson | ............. | B60K 15/0406 137/493.8 |
| 4,619,588 A * | 10/1986 | Moore, III | .......... | F04C 15/0053 310/154.14 |
| 4,871,296 A * | 10/1989 | Laessle | ................... | F02C 7/277 192/56.61 |
| 5,064,456 A * | 11/1991 | Gantzer | ................... | H02K 9/26 184/6.12 |
| 6,817,843 B2 | 11/2004 | Leising et al. | | |
| 8,998,564 B2 | 4/2015 | Lemmers, Jr. et al. | | |
| 2008/0237514 A1* | 10/2008 | Yonezawa | ........... | F15B 11/0445 251/121 |
| 2009/0000675 A1* | 1/2009 | Baros | ...................... | F16K 15/04 137/538 |
| 2011/0299971 A1* | 12/2011 | Lemmers, Jr. | .......... | F01D 11/10 415/1 |
| 2012/0237337 A1* | 9/2012 | Lemmers, Jr. | .......... | F01D 5/026 415/123 |
| 2013/0333770 A1* | 12/2013 | Maita | ..................... | F02M 59/48 137/315.41 |
| 2014/0202563 A1* | 7/2014 | Ball | ....................... | E03C 1/106 137/535 |

(Continued)

OTHER PUBLICATIONS

Bal-tec-ball material selection.*

*Primary Examiner* — Terrance Kenerly
(74) *Attorney, Agent, or Firm* — Locke Lord LLP; Scott D. Wofsy; Christopher J. Cillié

(57) ABSTRACT

A generator assembly includes a generator shaft defining an interior vent space. A valve assembly is positioned within the vent space configured to selectively allow venting of air through the generator shaft. A radial vent is positioned within the valve assembly configured to prevent oil from flowing through the vent space during operation and release air through the vent space during shutdown.

12 Claims, 4 Drawing Sheets

(56) References Cited

U.S. PATENT DOCUMENTS

| | | | |
|---|---|---|---|
| 2015/0192175 A1* | 7/2015 | Qiu | F16C 33/6651 |
| | | | 384/475 |
| 2015/0217438 A1* | 8/2015 | Myrhum, Jr. | F16K 15/18 |
| | | | 137/628 |
| 2016/0208939 A1* | 7/2016 | Patel | F16K 15/00 |
| 2017/0198668 A1* | 7/2017 | Rickis | F02M 37/0023 |

* cited by examiner

VENTING GENERATOR ASSEMBLIES

BACKGROUND OF THE INVENTION

1. Field of the Invention

The present disclosure relates to valves, and more particularly to pressure relief valves such as used in motors/generators.

2. Description of Related Art

Testing has shown generator internal case pressure can increase over time (i.e. several days or more) and achieve a level sufficient to actuate the case pressure relief valve during operation which potentially results in loss of oil overboard. This cycle of increasing pressure and venting can over time lead to an insufficient oil level within the generator, necessitating maintenance. Increased case pressure with operation can be caused by the noncontact lift-off seal pumping air into the generator.

Such conventional methods and systems have generally been considered satisfactory for their intended purpose. However, there is still a need in the art for improved pressure relief valves. The present disclosure provides a solution for this need.

SUMMARY OF THE INVENTION

A generator assembly includes a generator shaft defining an interior vent space. A valve assembly is positioned within the vent space configured to selectively allow venting of air through the generator shaft. A radial vent is positioned within the valve assembly configured to prevent oil from flowing through the vent space during operation and release air through the vent space during shutdown.

An oil restrictor can be positioned adjacent the valve assembly upstream of the radial vent configured to restrict the flow of oil through the radial vent and the vent space of the generator shaft. A retaining ring can be included such that the oil restrictor is positioned between the retaining ring and the valve assembly. The retaining ring and the oil restrictor can each have anti-rotation tabs to prevent rotation relative to the generator shaft during operation. The assembly can further include an O-ring surrounding the valve assembly configured to seal the valve assembly to generator shaft interior space.

The radial vent can include a check ball including tungsten or tungsten carbide. The check ball can be approximately 0.125 inches in diameter. A check ball retainer having a ball stop can be positioned within the retainer and the valve assembly such that the check ball retainer can include a removal feature. A second retaining ring can be positioned around the check ball retainer for securing the check ball retainer within the valve assembly.

The assembly can further include an annular channel in the gear shaft axially between the valve assembly and the interior vent space to provide oil escape paths that drain back into the generator sump. At least one gearbox air vent can be defined through the gear shaft from an exterior thereof into the interior vent space configured to release air flowing within the generator shaft. The gear shaft can include jaw features for engaging a disconnect shaft. The gear shaft can also include a receptacle for an input shaft opposite the disconnect jaw features, wherein the valve assembly is proximate the engagement features and the gearbox vent is proximate the receptacle.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
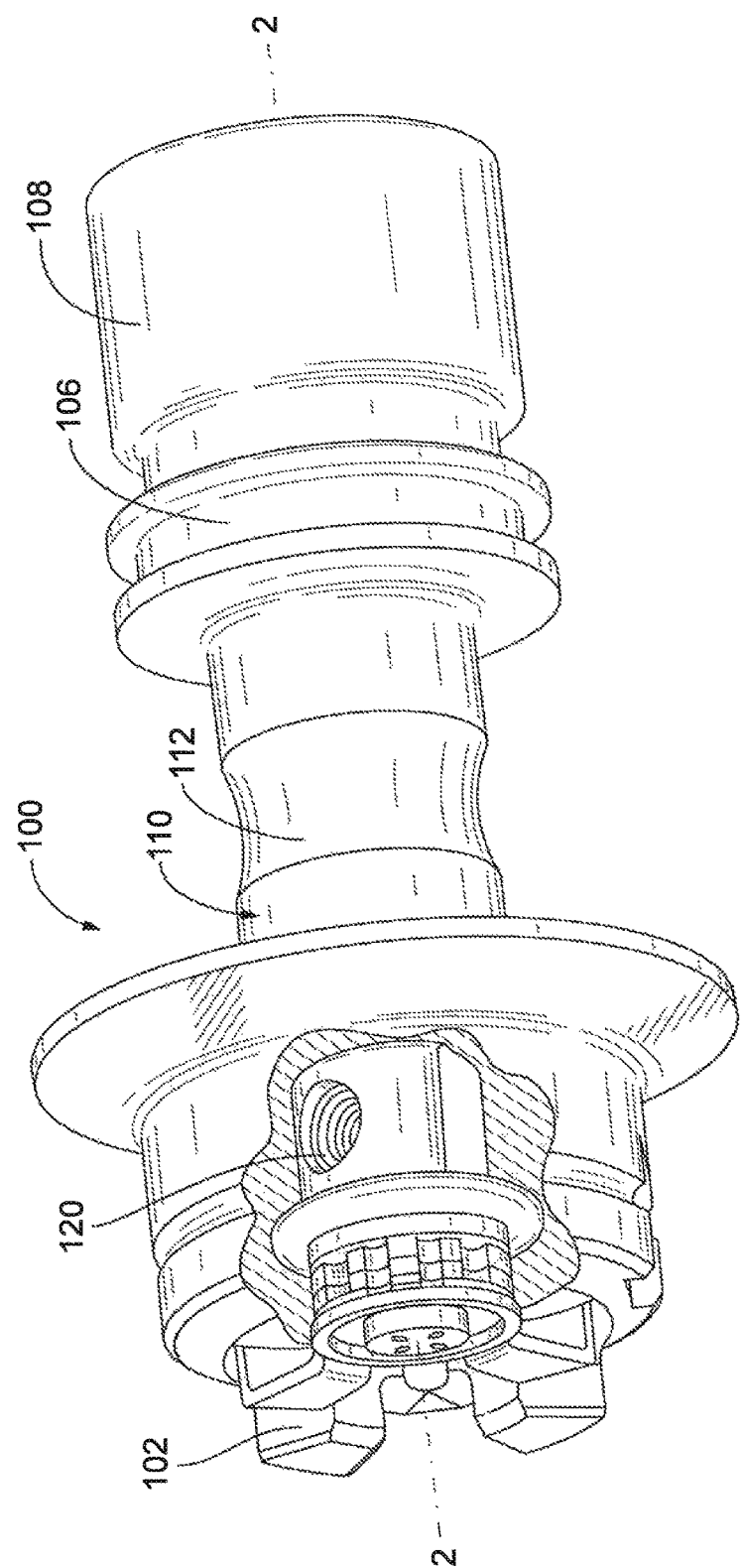
FIG. 1 is a schematic perspective view of an exemplary embodiment of a generator input shaft assembly constructed in accordance with the present disclosure, showing a valve assembly therein.

Reference will now be made to the drawings wherein like reference numerals identify similar structural features or aspects of the subject disclosure. For purposes of explanation and illustration, and not limitation, a partial view of an exemplary embodiment of a generator input shaft assembly in accordance with the disclosure is shown in FIG. 1 and is designated generally by reference character 100. Other embodiments of the generator assembly in accordance with the disclosure, or aspects thereof, are provided in FIGS. 2-6, as will be described. The system described herein can be used to prevent excess oil from leaking out of the generator assembly during operation and release air thereby relieving case pressure during shutdown.

Figure 2:
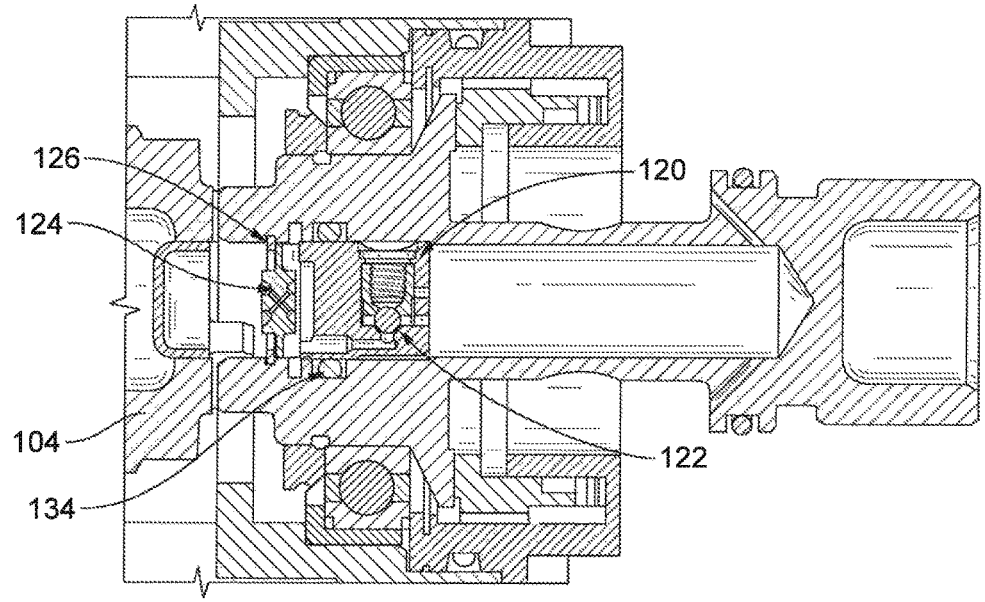
FIG. 2 is a cross-sectional view of the shaft of FIG. 1, showing a radial vent positioned with the valve assembly.

With reference to FIG. 1, a perspective view of a generator assembly 100 of the present disclosure is shown. The generator assembly 100 has disconnect shaft jaw features 102 for engaging with disconnect shaft 104 (shown in FIG. 2) and splines 108 for engaging with the aircraft accessory drive gearbox. The generator input shaft assembly shown can be used with motor/generators of an aircraft, e.g., aircraft variable frequency generators (VFGs) or integrated drive generators (IDGs), or in any sealed rotating machine were case pressure vent is required. The generator input shaft assembly 100 includes a generator shaft 110 defining an interior vent space 112. A valve assembly 120 is positioned within the vent space 112 proximate the disconnect jaws 102 and configured to selectively allow venting of air through the generator shaft 110. Referring to FIG. 2, a cross sectional view of the generator input shaft 110, taken along line 2-2 of FIG. 1, is shown. A radial vent 122 is positioned within the valve assembly 120 configured to prevent oil from flowing through the interior vent space 112 of the generator shaft 110 during operation and release air (i.e. pressure) from the vent space 112 during shutdown. In other words, the radial vent 122 allows for venting residual case pressure every time the generator assembly 100 is shutdown but also seals against a minimum required case pressure during operation. The radial vent 122 design is such that centrifugal force seals the generator during operation. Venting after every single shutdown cycle ensures generator case pressure does not build to a level necessary to actuate the case pressure relief valve of the aircraft. The addition of the valve assembly within the gear shaft interior space has very little impact to the overall weight of the design, the gearbox interface, the shear section rupture range, or the torsional stiffness of the VFG.

Figure 3:
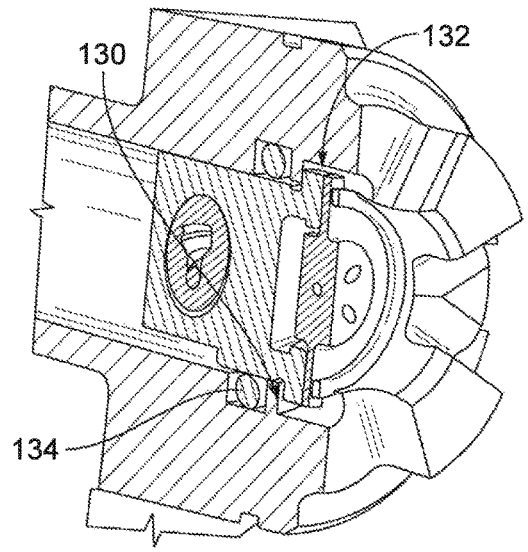
FIG. 3 is a cross-sectional perspective view of the valve assembly of FIGS. 1 and 2, showing anti-rotation tabs and oil escape paths.
Figure 4:
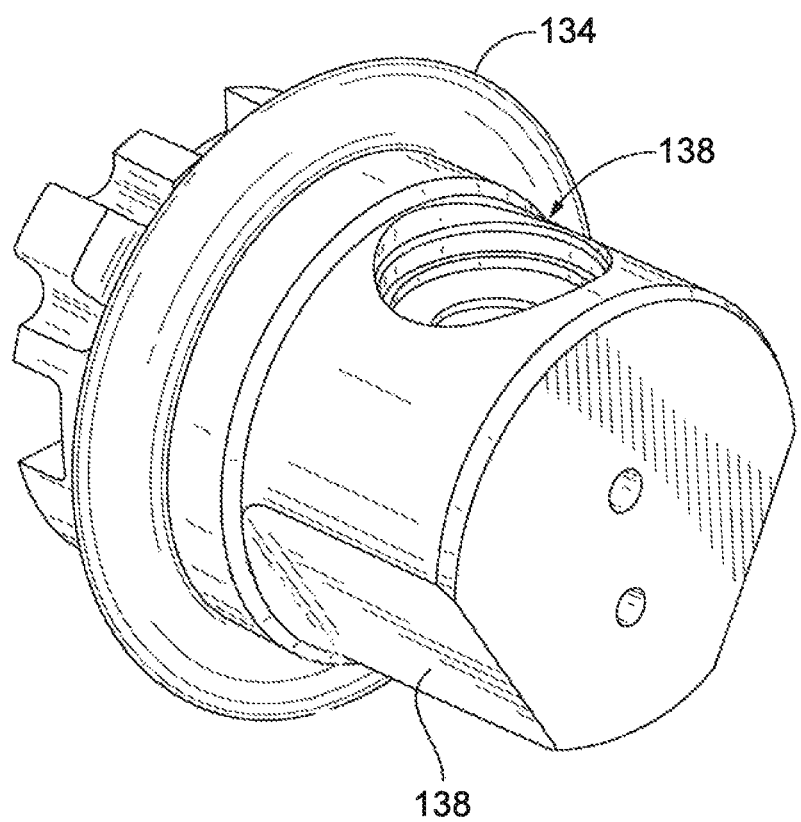
FIG. 4 is a perspective view of an exterior of the valve assembly of FIGS. 1 and 2.

With continued reference to FIG. 2, an oil restrictor 124 is adjacent the valve assembly upstream the radial vent 122 positioned between the valve assembly 120 and a retaining ring 126. The oil restrictor 124 is configured to restrict the flow of oil through the radial vent 122 and the vent space 112 of generator input shaft 110. The radial vent 122 location along with the oil restrictor 124 ensure near zero leakage of oil from the generator shaft during venting. However, should oil flow past the oil restrictor, at least one axially channel is present in the gear shaft axially between the valve assembly and the interior vent space to provide an oil escape path 130, shown in FIG. 3, which drains back to the generator sump. Both the valve assembly 120 and the oil restrictor 124 include anti-rotation tabs 132 to prevent rotation relative to the generator shaft 110 during operation. Referring to FIGS. 2-4, an O-ring 134 surrounds the valve assembly 120 configured to seal the valve assembly to generator shaft interior space of the generator shaft 110. Furthermore, several balance cuts 138 reduce the overall diameter of the exterior of the valve assembly 120 reduce imbalance load under operational speeds.

Figure 5:
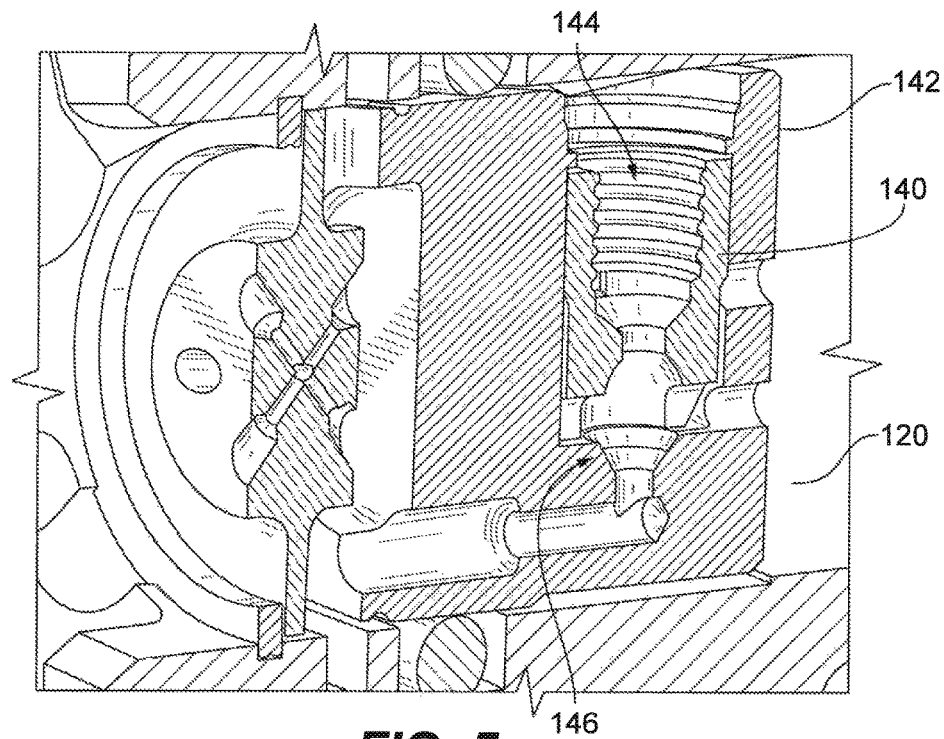
FIG. 5 is a cross-sectional perspective view of the valve assembly of FIGS. 1 and 2, showing the retainer and location radial vent hole.
Figure 6:
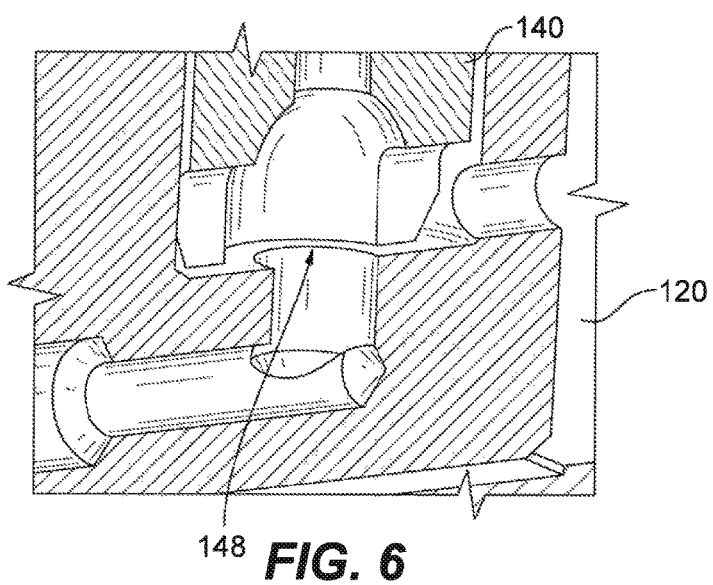
FIG. 6 is a cross-sectional view of another embodiment of the radial vent hole of FIG. 4.

With reference to FIGS. 5 and 6 a retainer 140 is shown for housing the radial vent 122 within the valve assembly 120. The radial vent 122 can include a check ball that is approximately 0.125 inches in diameter of tungsten or tungsten carbide. Those skilled in the art will appreciate that the size and materials of the check ball can vary to adjust the sealing pressure capability of the vent without departing from the scope of the present disclosure. The retainer 140 can be press fit or slip fit into the valve assembly with a second retaining ring 142 around the retainer 140 for securing the retainer therein. Furthermore, the retainer 140 can include a removal feature 144. For example, as shown, threads within the retainer allow for a screw and tool to be used to remove the retainer. The radial vent 122 sits within a ball seat 146 between the retainer 140 and the valve assembly 120. The ball seat 146 can include variations in configuration to suit the needs of the particular design. As shown in FIG. 5, a portion of the ball seat 146 tapers downwardly into the valve assembly 120. As shown in another embodiment of FIG. 6, the ball seat 146 has a rounded edge 148 into the valve assembly 120 that is lapped or coined therein. The retainer 140 allows the check ball 122 to remain fairly centered within the valve assembly 120.

The methods and systems of the present disclosure, as described above and shown in the drawings, provide for a relief valve with superior properties including preventing excess fluid flow during operation and venting pressure during shutdown. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A generator assembly, comprising:
a generator shaft defining an interior vent space;
a valve assembly within the vent space configured to selectively allow venting of air through the generator shaft;
a radial vent positioned within the valve assembly configured to prevent oil from flowing through the vent space during operation and release air through the vent space during shutdown, wherein the radial vent is sealed due to centrifugal force during operation and released after every shutdown cycle; and
an oil restrictor adjacent the valve assembly upstream of the radial vent configured to restrict the flow of oil through the radial vent and the vent space of the generator shaft,
wherein the retaining ring and the oil restrictor each have anti-rotation tabs to prevent rotation relative to the generator shaft during operation.

2. The assembly of claim 1, further comprising a retaining ring, wherein the oil restrictor is positioned between the retaining ring and the valve assembly.

3. The assembly of claim 1, further comprising an O-ring surrounding the valve assembly configured to seal the valve assembly to generator shaft interior space.

4. The assembly of claim 1, wherein the radial vent includes a check ball.

5. The assembly of claim 4, wherein the check ball includes tungsten or tungsten carbide.

6. The assembly of claim 4, where the check ball is 0.125 inches in diameter.

7. The assembly of claim 4, further comprising a check ball retainer having a ball stop within the retainer and a ball seat within the valve assembly.

8. The assembly of claim 7, wherein the check ball retainer includes a removal feature.

9. The assembly of claim 7, wherein a second retaining ring is positioned around the check ball retainer for securing the check ball retainer within the valve assembly.

10. The assembly of claim 1, further comprising an annular channel in an input shaft axially between the valve assembly and the interior vent space to provide oil escape paths.

11. The assembly of claim 1, wherein the input shaft includes disconnect jaw features for engaging the generator disconnect shaft.

12. The assembly of claim 1, wherein the input shaft includes a spline for engaging the aircraft accessory drive gearbox opposite the disconnect jaws, wherein the valve assembly is proximate the engagement features and the gearbox vent is proximate the receptacle.

* * * * *